United States Patent
Wang et al.

(10) Patent No.: US 8,548,490 B2
(45) Date of Patent: Oct. 1, 2013

(54) MULTI-OBJECTS POSITIONING SYSTEM AND POWER-CONTROL BASED MULTIPLE ACCESS CONTROL METHOD

(75) Inventors: Yongcai Wang, Beijing (CN); Junhui Zhao, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 967 days.

(21) Appl. No.: 12/607,364

(22) Filed: Oct. 28, 2009

(65) Prior Publication Data
US 2010/0109849 A1  May 6, 2010

(30) Foreign Application Priority Data

Oct. 30, 2008 (CN) .......................... 2008 1 0173613

(51) Int. Cl.
*H04W 24/00* (2009.01)
*H04B 7/00* (2006.01)

(52) U.S. Cl.
USPC .................. 455/456.1; 455/456.2; 455/456.3; 455/522; 455/127.1

(58) Field of Classification Search
USPC .............. 455/456.1, 456.2, 456.3, 522, 127.1
See application file for complete search history.

(56) References Cited

U.S. PATENT DOCUMENTS

| | | | | |
|---|---|---|---|---|
| 7,293,088 B2* | 11/2007 | Douglas et al. | ............... | 709/224 |
| 7,295,119 B2* | 11/2007 | Rappaport et al. | .......... | 340/572.4 |
| 7,769,407 B2* | 8/2010 | Lundell et al. | ................ | 455/522 |
| 8,155,587 B2* | 4/2012 | Sasai et al. | .................... | 455/41.2 |
| 2004/0219931 A1* | 11/2004 | Bi et al. | .................... | 455/456.1 |
| 2005/0020207 A1* | 1/2005 | Hamada et al. | .............. | 455/41.2 |
| 2008/0318595 A1* | 12/2008 | Rofougaran | ............... | 455/456.1 |
| 2009/0161578 A1* | 6/2009 | Yeung et al. | .................. | 370/254 |

* cited by examiner

*Primary Examiner* — Wen Huang
(74) *Attorney, Agent, or Firm* — Sughrue Mion, PLLC

(57) ABSTRACT

The present invention provides a multi-objects positioning system and power-control based multiple access control method. The multi-objects positioning system according to the present invention comprises a plurality of tag devices carried by multiple objects and one or more positioning devices for determining the positions of the objects, wherein each of the tag devices includes a positioning device list for recording status information of the positioning devices. According to the present invention, tag device broadcasts Channel Request Packet (CRP) intermittently; positioning device, which is idle and receives the CRP, broadcasts Channel Allocation Packet (CAP) in its coverage range to allocate a channel to the tag device that is the sender of the CRP and inform information of the positioning device to other tag devices; tag device, which receives the CAP, updates its positioning device list according to the contents of the CAP; and the tag device adjusts transmission power of the CRP by referring to the positioning device list. With the present invention, the EN and HN problems existing in the prior arts can be solved effectively, and it is helpful to solve signal collision and improve spatio-temporal reuse capacity of the system.

18 Claims, 10 Drawing Sheets

Example case of Hidden Node (HN)

Example case of Exposed Node (EN)

MULTI-OBJECTS POSITIONING SYSTEM AND POWER-CONTROL BASED MULTIPLE ACCESS CONTROL METHOD

FIELD OF THE INVENTION

The present invention generally relates to multiple access control for a multi-objects positioning system. In particular, the present invention provides a distributed, power-control based multiple access control method for simultaneously tracking of multiple tag devices in an autonomous object positioning system.

BACKGROUND

Object positioning (localization) system is a technology with broad applicability in many application areas, such as office, healthcare, security, coalmine, subway, smart building, restaurant etc. A necessary feature that a success localization system must have is the multiple access control capability, that with such a mechanism, multiple mobile objects can be localized simultaneously. It is a general requirement of many localization-based applications. The positioning system should simultaneously localize all visitors and provide guidance information accordingly. For patients, doctors and assets tracking in a hospital, there may be many patents, doctors and assets presenting together in the same operating room. Therefore, it is necessary to track multiple objects simultaneously by a location system. Other application scenarios, such as office, subway, smart building and restaurant etc. all need simultaneously tracking of multiple objects.

So far, for the requirement of tracking of multiple mobile objects, an Autonomous Ultrasound Indoor Tracking System (AUITS) was proposed as a highly accurate, highly robust and customer-friendly indoor tracking system. It employs the idea of positioning on one device (POD) and uses Time Of Arrival (TOA) of ultrasound for distance measurement. The POD is a positioning device of a fixed topology structure, which integrates a plurality of ultrasound receivers into a single device and can be installed everywhere according to the user's requirement. The POD is a compact device (looks almost like a Frisbee). When being used, the POD can spread several telescopic rods like the skeleton of an umbrella, and at the end of each rod there is an ultrasound receiver. Since the topology of the extended POD is fixed and the coordinates of such receivers can be calculated easily, manual calibration of the ultrasound receivers' coordinates is no longer needed. Besides this, since all of the receivers are on one device, the complex wireless-based signaling and network protocols are no longer needed. FIG. 1 shows a multi-objects positioning system, which includes two PODs, i.e. R1 and R2. Regarding the detailed description of the AUITS system and the POD, please refer to a Chinese patent application No. 200810006317.0, titled "Positioning on One Device (POD) and Autonomous Ultrasound Positioning System and Method Using the POD", which was filed by the same applicant of the invention on Jan. 29, 2008. This priority application is incorporated here by reference in its entirety for all purposes.

For purpose of simplicity, the present invention is described by taking the AUITS system and the POD positioning device as an example. However, it can be easily realized from the following detailed description that the principle and technical solution of the present invention is not only limited to the AUITS system and the POD positioning device, but can be applied to other common indoor positioning systems and positioning devices, as long as such positioning systems and devices possess appropriate functions for achieving mobile object tracking.

An example of the AUITS system is shown in FIG. 1, which includes multiple tag devices and multiple PODs. In this example, the AUITS system includes two PODs and three tag devices. The POD is designed as a positioning device with structural topology to be mounted in the monitoring environment for ease of installation and ease of calibration. It consists of a RF transceiver in center and multiple US receivers spreading around. Tag devices T1, T2 and T3 are attached to mobile objects to be tracked by PODs. Each of the tag devices consists of RF transceiver and US transmitter. As shown in FIG. 1, when the AUITS system is in use, a tag device sends RF and US signals to POD. RF signal is used for time synchronization and tag device identification; US signal is used to measure the distances between tag devices and US receivers. Then, the position of the tag device (i.e. the object) can be inferred by POD based on the distance measurements to the multiple US receivers. This invention will mainly address the multiple access control problem of a multi-objects positioning system, such as the AUITS system.

In the AUITS system, design of the multiple access control (MAC) protocol is very crucial, which allows multiple PODs to detect all tag devices correctly and efficiently in their operating range. Especially, for the multi-objects positioning system, such as AUITS, several problems will be posed if an efficient MAC protocol is absent. For example, signal collision may happen in whether RF or Ultrasound transmissions. Thus, it may cause incorrect measurement of TOA, resulting in positioning error. If signal collision happens, time occupied by collided signals will be wasted, resulting in lower capacity. Also, to achieve better coverage and better capacity, multiple PODs may be deployed. However, since multiple tag devices cannot be simultaneously tracked, the densely deployed PODs cannot be sufficiently utilized. The POD resources will be wasted. These problems will pose great challenges in AUITS applications. However, they are only appearances of some essential problems. In order to design an efficient MAC protocol, we need to analyze and address the essence behind the challenging problems. For example, the Hidden Node (HN) problem and the Exposed Node (EN) problem as described below.

FIGS. 2A and 2B are schematic diagrams for explaining the HN and EN problems.

1. Hidden Node (HN) Problem

It is the basic requirement for MAC design to avoid signal collision, that is, MAC should prevent simultaneous transmissions by interfering tag devices caused by HN Problem.

As shown in FIG. 2A, HN problem happens when two tag devices T1 and T2 cannot sense each other's traffic, while they are transmitting simultaneously to the same receiver R (e.g. POD). HN problem will result in positioning error and low capacity. Denote $D_{CS}$ as carrier sense radius of the tag device, $D_T$ as transmission distance of the tag device, condition of HN problem is:

$$\begin{cases} |T_1 - T_2| > D_{CS} \\ |T_1 - R| < D_T \\ |T_2 - R| < D_T \end{cases} \quad (1)$$

Traditional method to overcome the HN problem is to enlarge $D_{CS}$, to make $D_{CS} > 2D_T$. However, enlarging carrier sense radius may cause another serious problem, i.e. Exposed Node (EN) problem that will be introduced in the following.

In addition, regarding the AUITS system, two kinds of physical signal, RF and US signals, are employed for object tracking. Therefore, both RF and US channels should be considered elaborately for anti-collision protocol design. In addition, considering that RF and US are always emitted in pair from tag devices, and the propagation speed of US (around 340 m/s) is much slower than RF and the US is not encoded, these characters should be collaboratively considered and thoroughly in process of MAC protocol design.

2. Exposed Node (EN) Problem

Besides signal collision avoidance, another important requirement for MAC protocol is efficiency, which means the ideal MAC protocol can make full use of the spatio-temporal reuse of RF and US channels so that the AUITS system can be allowed to simultaneously track multiple tag devices s as many as possible. In order to achieve this, the MAC protocol should be designed to resist the Exposed Node (EN) Problem.

As shown in FIG. 2B, EN problem happens when a link was prohibited due to carrier sensing of current link. However, in this case, the intended link will not collide with the current link. In the example shown in FIG. 2B, when the tag device T2 want to transmit to the positioning device R2, it senses carrier of the active traffic of another tag device T1. To avoid collision, T2 will not transmit to R2. Indeed, transmission from T2 to R2 will not collide with the current transmission T1 to R1. Thus, EN problem happens. EN problem will cause waste of POD resources and low capacity. Condition of EN problem is as follow:

$$\begin{cases} |T_1 - T_2| < D_{CS} \\ |T_1 - R_1| < D_T \\ |T_2 - R_2| < D_T \\ |T_2 - R_1| > D_T \\ |T_1 - R_2| > D_T \end{cases} \quad (2)$$

In contrary to solution to the HN problem, traditional method to overcome EN problem is to reduce $D_{cs}$. Thus, there is a difficulty to find a good balance to solve the HN and EN problems at the same time.

In addition, Fairness is also an important factor to be considered in MAC protocol design. The purpose of fairness is to allow that the different tag devices have statistically similar chances to be localized in the AUITS system. It is not expected that some tag devices are located more frequently and other tag devices seldom.

Based on the above analysis, to design and develop a MAC protocol, it is important to avoid signal collision of RF+US signals, to improve Spatio-temporal reuse and to keep fairness in multiple tag devices tracking of the AUITS system. These are just main goals of the present invention.

There are numerous MAC protocols proposed since 1970 for network and wireless network communication, such as Carrier Sense Multiple Access with Collision Avoidance (CSMA/CA), Time Division Multiple Access (TDMA), etc. The motivation of the above MAC design is to accomplish data communication between mobile node and base station. Such MACs are also applicable for location system with single signal, such as RF-only or ultrasound-only based indoor location system. For example, a RADAR system is proposed in P. Bahl. etc. "RADAR: An In-Building RF-based User Location and Tracking System" in Proc. IEEE INFO-COM, 2000. It is a location system based on received signal strength of 802.11 wireless network which uses the same MAC protocol of 802.11 WLAN. In addition, "Sonitor" system of Pat. No. WO 03/087871 A1 to S. Holm entitled "A system and method for position determination of objects" is an ultrasound-only indoor positioning system to achieve room-granularity location accuracy. Tag devices of the Sonitor transmit 20 kHz to 40 kHz ultrasound signals to receivers located in the listening area. In particular, the Sonitor system uses Carrier Sense Multiple Access technique of ultrasound signal to assign ultrasound channel to tag devices. If the US channel is free, tag device communicates a unique signal to the receivers and then the receivers read the signals, detect arrival time and then forward their detection to a central server.

However, those conventional MAC protocol cannot be used directly for multiple-signal based indoor positioning systems, where different physical signal channels should be jointly considered for MAC protocol design. This is especially true for the AUITS system in which RF and US signals are employed for object tracking. To solve this problem, the most related existing solution is "Cricket" system cited from B. Nissanka, etc. The Cricket Location-Support System is described in "Proceedings of the Sixth International Conference on Mobile Computing and Networking, Boston, Mass., USA, August 2000". This article is incorporated here by reference in its entirety for all purposes. The "Cricket" system consists of a set of independent, unconnected transmitters installed in a building. Each transmitter can transmit both RF and US signals. FIG. 3 shows a brief structural block diagram of the Cricket system. It is shown in the system of FIG. 3 a transmitter 310 and a receiver 320. The "Cricket" system employs a randomization based MAC protocol in which the transmission time of each transmitter is chosen randomly with a uniform distribution within an interval [T1, T2] ms. As shown in FIG. 3, the transmitter 310 sets transmission time of different beacons by using a random delay means 311. Thus, the broadcasts of different beacons are statistically independent. After a randomly delay, a traffic sensing means 312 of the transmitter 310 senses RF carrier for $D_{us}$ time. $D_{us}$ is an expected interval for ultrasound to disappear. The aim to do this is to prevent the collision between new transmission of RF+US and existing RF and US signal from other transmitter. During the $D_{us}$, a transmit decide means 313 determines whether the channel is free. If the channel is free during $D_{us}$, the transmit decide means 313 indicates a signal transmit means 314 to transmit new RF+US signals. Otherwise, the transmitter continues to wait for a randomized delay until channel is clean. FIG. 3 also shows a receiver 320 as the positioning device side. The receiver 320 includes a signal receive means 322 for receiving RF+US signals from the transmitter, and a location calculate means 323 for calculating the position of the object according to the detection results.

However, the randomization based MAC protocol employed by the Cricket system cannot solve the HN and EN problems. First, taking the case of FIG. 2A as an example and with reference to the block diagram of the Cricket system shown in FIG. 3, a timing chart for the HN problem is shown in FIG. 4A. T1 and T2 first perform random delay, then sense RF carrier during $D_{us}$ time. Since neither of T1 and T2 can sense the transmission signal each other, both of them decide to transmit signal to the POD R. In turn, the RF+US signals transmitted by the T1 and T2 will collide at the receiver R. Indeed, the "Cricket" system applies a "discarding" method against the FIN problem. That is, if the receiver R receives more than one RF message during $D_{us}$, the receiver cannot be certain about which RF message the US signal corresponds, and then the receiver discards the US signal and the RF messages. Although this processing can remove positioning error caused by signal confusion, the channel capacity and resource utilization efficiency are rather low. In addition, by taking the case of FIG. 2B as an example, the EN problem also exists in the Cricket system. As shown in FIG. 4B, T1 and T2 first perform random delay. Then, T1 senses RF carrier during the $D_{us}$ time and decides to transmit RF+US signal to the POD R1, thereby establishing a path $L_{T1,R1}$. Next, T2 senses traffic from T1, and will not transmit signal to R2 any more. In this way, the desired transmission between T2 and R2 is forbidden due to carrier sensing. However, indeed, $L_{T2,R2}$ will not collide with $L_{T1,R1}$. Thus, it may lead to waste of channel resource. As far, it is not mentioned in the Cricket system how to solve the EN problem.

Other related existing solution is a "Bat" system of U.S. Pat. No. 6,493,649 to Jones entitled "Detection system for determining positional and other information about objects". The "Bat" system deploys ultrasound receivers on the ceiling of room to be monitored. These receivers are placed in an array and connected by wired network to a controlling base station. An ultrasound transmitter is attached to the object to be tracked. In the Bat system, a centralized TDMA-like MAC protocol was used in which all object transmitters are registered to be allocated a time slot for locating. Periodically, the base station broadcasts an identifier as an RF signal. Simultaneously, the base station sends a synchronization pulse via the wired network to all the connected ultrasound receivers. When an object hears its ID broadcast, it emits an ultrasonic signal. Regarding the TDMA-like protocol presented in the Bat system, its disadvantages include 1) a centralized base station is maintained that needs much cost and efforts; and 2) all object tags should be registered at system bootstrap phase. It is difficult to add a new tag device into system when working. Thus, the flexibility of system is not good. In addition, the key problem to the Bat system is low spatial-temporal reuse of resource. In order to track individual object tag device, it required that all positioning devices will wait for the signal emission of the specific tag in its time slot. However, in fact, there are only a small subset of positioning device can detect and sense the signal from such a tag device and more other devices stay always IDLE state during the period.

SUMMARY OF THE INVENTION

The present invention provides a power-control based multiple access control method and system for multiple objects tracking and positioning. The present invention also provides MAC protocol for multiple PODs and multiple tag devices tracking scenario. Its design aim is to avoid positioning signal collision (both RF and Ultrasound signals) in the prior arts, to improve Spatio-temporal reuse of wireless channel and to eliminate the EN and HN problems.

According to the first aspect of the invention, it is provided a power-control based multiple access control method for a multi-objects positioning system, which comprises a plurality of tag devices carried by the objects and one or more positioning devices for determining the positions of the objects, wherein each of the tag devices includes a storage unit for storing a positioning device list, which is used for recording status information of the positioning devices, the method comprising: tag device broadcasting Channel Request Packet (CRP) intermittently; positioning device, which is idle and receives the CRP, broadcasting Channel Allocation Packet (CAP) in the range of coverage, wherein the CAP is used for allocating a channel to the tag device that is the sender of the CRP received by the positioning device and informing information of the positioning device to other tag devices; tag device, which receives the CAP, updating the positioning device list stored therein according to the contents of the CAP; and tag device adjusting transmission power of the CRP by referring to the positioning device list. In addition, in one embodiment, if the tag device receiving the CRP determines that the tag device identifier (TagID) carried by the CRP matches its own identifier, it starts transmission of the following positioning signals (RF+US signals). The positioning device (e.g. POD) can calculate the position of the object by using the received positioning signals.

According to the second aspect of the invention, it is provided a multi-objects positioning system capable of implementing power-control based multiple access control, which comprises a plurality of tag devices carried by the objects and one or more positioning devices for determining the positions of the objects. The tag device comprises: a storage means for storing a positioning device list, which is used for recording status information of the positioning devices; a channel request means for broadcasting Channel Request Packet (CRP) intermittently; a positioning device list updating means for updating the positioning device list according to contents of Channel Allocation Packet (CAP) received from the positioning device; and a transmission power adjusting means for adjusting transmission power of the CRP by referring to the positioning device list. The positioning device comprises: status response means for receiving the CRP from the tag device, and when the positioning device is Idle, broadcasting the CAP in the range of coverage, wherein the CAP is used for allocating a channel to the tag device that is the sender of the CRP received by the positioning device and informing information of the positioning device to other tag devices.

In a multi-objects positioning system, tag devices are attached on mobile objects to be tracked and each tag device contains a RF transceiver and a US transmitter. As an example, multiple PODs can be mounted in the monitoring environment as positioning device. As described above, each POD is composed of a RF transceiver in center and several surrounding US receivers, and the POD has a fixed structural topology. The POD is described here as only an example, but not to limit the scope of the invention. It can be realized by those skilled in the art that the principle of the invention can be similarly applied to other positioning devices well-known in the art. Comparing with prior arts, key point of the present invention is to invent techniques to make the tag devices be aware of status of the positioning devices (e.g. PODs) in its neighborhood. Thus, tag devices can smartly adjust transmission power to send RF+US signal to the closest and IDLE POD. In this way, the RF and US channel can be sufficiently used, while collisions can be avoided. The proposed technique to make the tag device smart is to maintain a positioning device list in every tag device to record neighborhood PODs information through an online CRP-CAP exchanging processing between PODs and tag devices. The list is set up and continuously updated in every tag device. According to the statuses of PODs in the list, tag device can determine autonomously when to transmit and to adaptively select the transmission power.

In bootstrapping stage, the positioning device lists of all tag devices s are empty. Transmission power of CRP is default. Before each transmission of RF+US data, all tag devices will compete in RF channel for broadcasting Channel Request Packet (CRP) to POD for localization request. As CRP is received by POD, POD soon responses a Channel Allocation Packet (CAP) to all tag devices in its operating range. The purposes of CAP are twofold: 1) tell the tag device sending the CRP to emit RF+US pair for localization, in other words, channel is assigned to this tag device; 2) notify all other tag devices that the POD will be BUSY during the period of RF+US transmission with the assigned tag device. Based on CAP, both the tag device assigned channel and the tag devices not assigned channel can update the POD's information in their individual positioning device list. In the list, the POD information includes PODID, Distance to POD, POD status, etc. Distance to POD is measured by Radio Signal Strength (RSS) of RF signal for example, and PODID and POD Status are known from contents of CAP message. Next, those tag devices failing to be assigned channel will lower its sending power to continue to make CRP attempt for possible channel assignment from other neighboring POD. The purposes of lowering sending power are twofold: 1) to reduce communication range for finding other closer POD; 2) to avoid collision to the existent active transmission of RF+US. Through several round of CRP-CAP exchange between PODs and tag devices, each tag device can find all neighboring PODs and construct a positioning device list that can be continuously online updated. When the positioning device list is not empty, for each CRP transmission, tag device will adaptively select transmission power to emit CRP to the nearest POD for localization request.

Due to the CRP-CAP exchange between POD and tag device, when the transmission radius of CAP satisfies a condition, the HN problem can be solved. More exactly, if the transmission radius of CAP is larger than the maximum transmission distance of CRP, the MAC method of the present invention is HN free. Therefore, the MAC method of the present invention can efficiently prevent simultaneous transmission from interfering tag devices. The solution of the present invention to the HN problem will be described in more details in the following contents.

In addition, In the MAC method of the present invention, carrier sensing is no longer the evidence of transmission decision. With CRP-CAP based channel assignment process, in case the transmission links don't collide, all transmissions can be established simultaneously by smartly transmission power selection, no matter whether the transmitters can sense each other's active traffic or not. This makes the MAC method of the present invention EN-free. Thus, MAC method of the present invention enables simultaneously localization of multiple tag devices in multiple PODs system. The solution of the present invention to the EN problem will be described in more details in the following contents.

In the present invention, it can guarantee at any time every receiver is communicated with only one transmitter. Thus, RF and US collision will not happen.

In addition, Since tag devices can smartly select the nearest and IDLE POD and appropriately adjust transmission power to avoid interference with other tag devices, simultaneous connections between different tag devices and PODs are possible, so the spatio-temporal reuse can be highly improved compared with prior arts.

BRIEF DESCRIPTIONS OF THE DRAWINGS

The foregoing and other features of this invention may be more fully understood from the following description, when read together with the accompanying drawings in which.

DETAILED DESCRIPTION OF THE PREFERRED EMBODIMENTS

Figure 5:
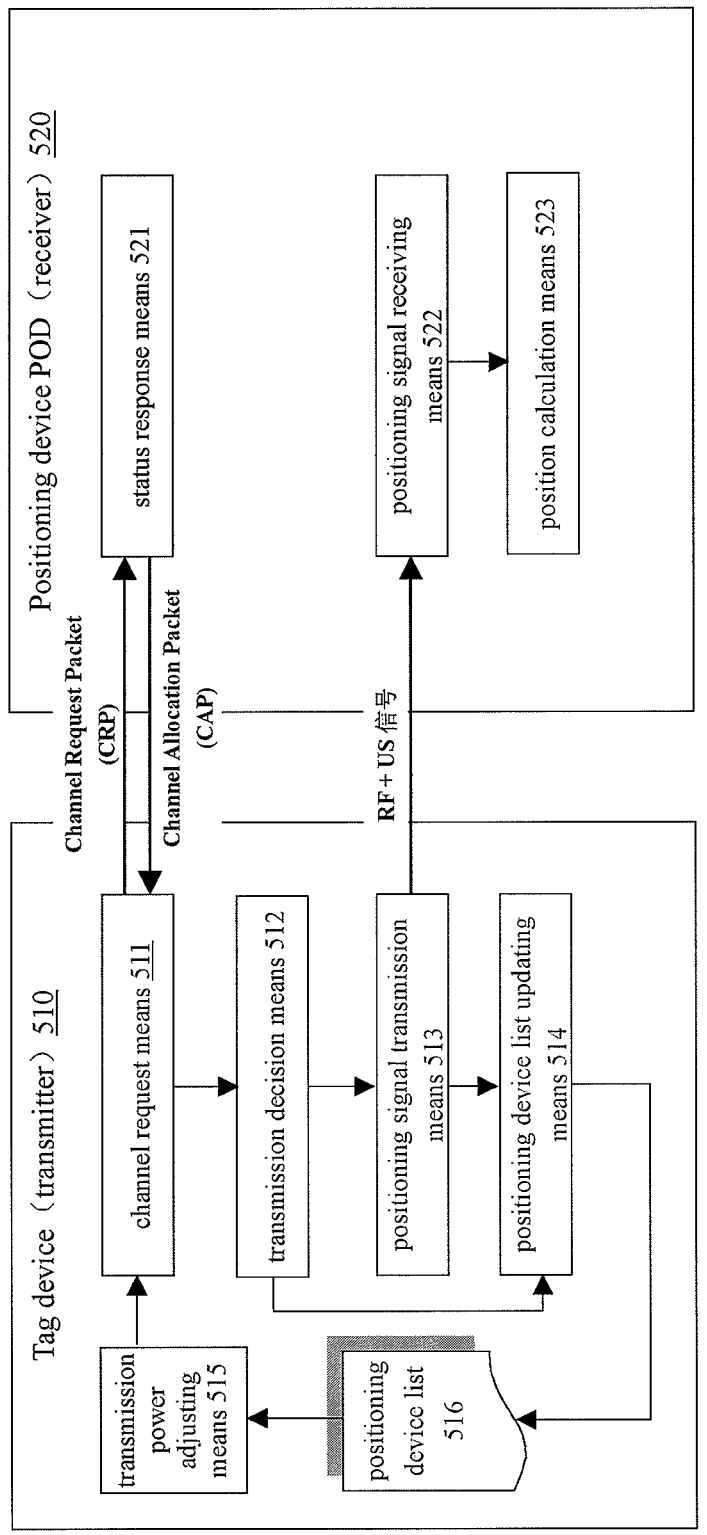
FIG. 5 is a structural block diagram for showing a multi-objects positioning system 500 capable of implementing power-control based multiple access control, according to the present invention.

FIG. 5 is a structural block diagram for showing a multi-objects positioning system 500 according to the present invention, which is capable of implementing power-control based multiple access control. For purpose of simplification of explanation, it is only shown in FIG. 5 interaction between one tag device (transmitter) 510 and one positioning device (receiver) 520. However, the system 500 can include more than one tag devices and positioning devices. Here, the positioning device 520 is for example a POD device. In the system 500, the tag device 510 is attached to a mobile object to be tracked, and each tag device can include RF transceiver and US transmitter (not shown). A plurality of PODs 520 are mounted in the monitoring environment (e.g. on the ceiling) for tracking and localizing multiple mobile objects in the environment. POD consists of a RF transceiver in the center and multiple US receivers spreading around (not shown).

As shown in FIG. 5, the tag device 510 comprises a channel request means 511, a transmission decision means 512, a positioning signal transmission means 513, a positioning device list updating means 514, a transmission power adjusting means 515 and a positioning device list 516 for recording status of neighboring PODs. Correspondingly, the positioning device (POD) 512 comprises a status response means 521, a positioning signal receiving means 522 and a position calculation means 523.

Figure 7:
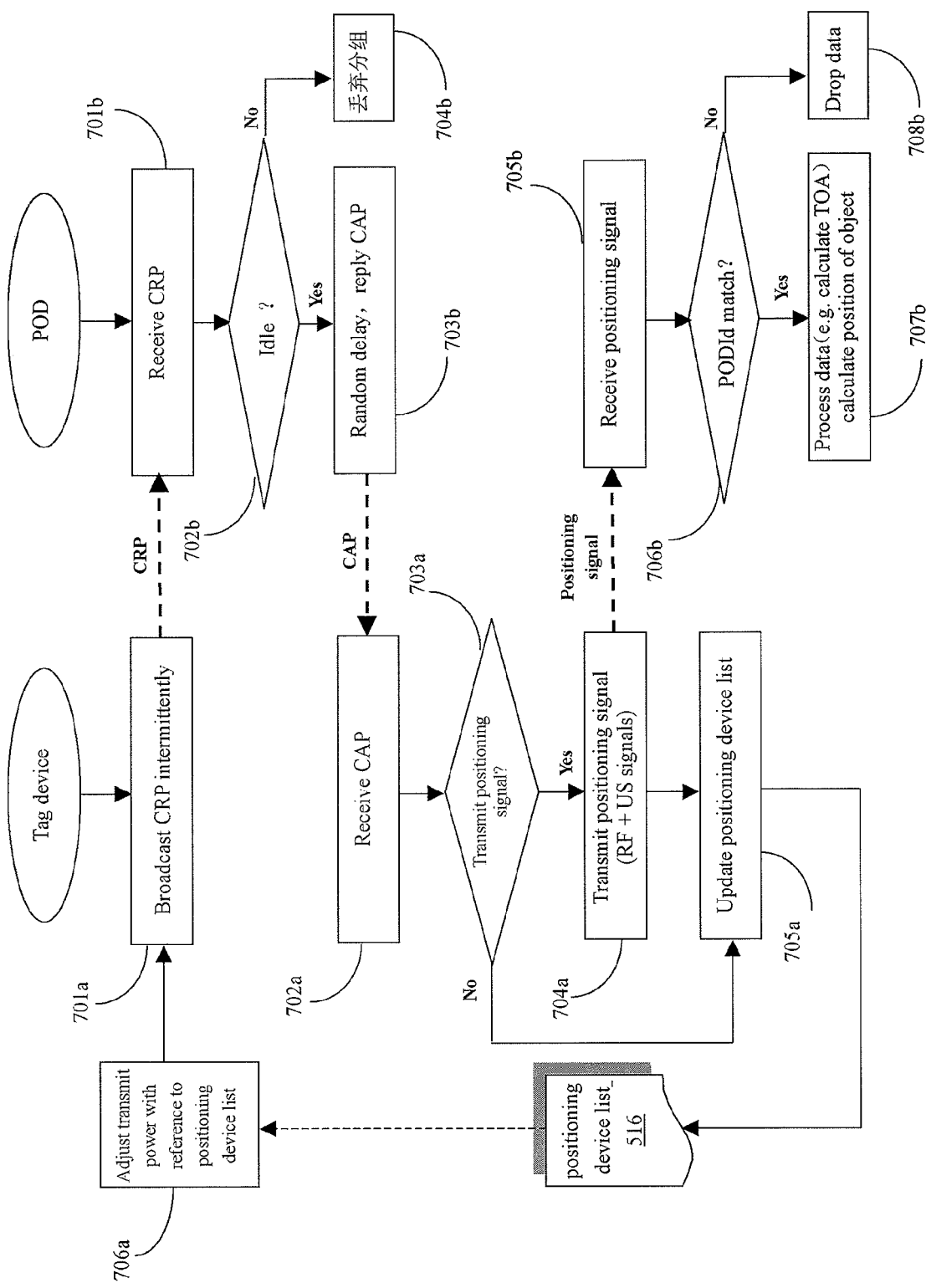
FIG. 7 is a flow chart for showing the operation process of the system shown in FIG. 5.

FIG. 7 is a flow chart for showing the operation process of the system 500 shown in FIG. 5. Below, we will describe the functional principle of the multi-objects positioning system 500 capable of implementing power-control based multiple access control, according to the present invention.

Figure 6:
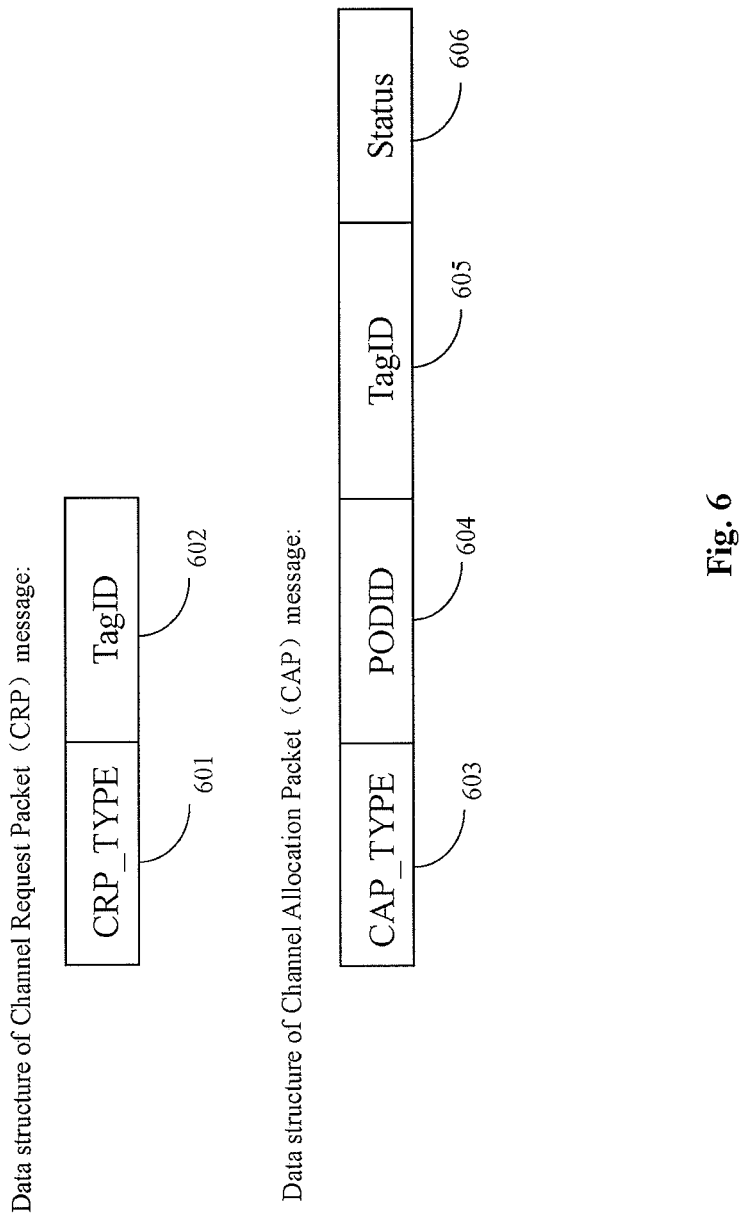
FIG. 6 shows data structures of the Channel Request Packet (CRP) and the Channel Allocation Packet (CAP) messages.

First, in the step 701a, the tag device 510 broadcasts Channel Request Packet (CRP) intermittently by using the channel request means 511. Data structure of the CRP message is shown in FIG. 6. As shown in FIG. 6, the CRP message contains CRP_TYPE 601 and TagID 602, CRP_TYPE 601 identifying type of the message, and TagID 602 being an identifier for identifying the tag device that transmitted the CRP. The CRP message broadcasting is used to request wireless channel before transmitting positioning signal (i.e. RF+US data) to neighboring PODs. In the present invention, when the channel request means 511 broadcasts the CRP, transmission power of CRP needs to be adjusted according to different situations. That is, the channel request means 511 broadcasts CRP message in terms of transmission power that has been adjusted by the transmission power adjusting means 515. In one embodiment, the transmission power adjusting means 515 can adaptively adjust transmission power according to the contents of the positioning device list 516. For example, when the positioning device list 516 is empty, the channel request means 511 selects default transmission power $P_0$ for CRP transmission. If the positioning device list 516 is not empty, and the closest POD $R_{nearest}$ in the list is IDLE, the transmission power adjusting means 515 adjusts its transmission power to make the channel request means 511 broadcast CRP message to the closest and IDLE POD. If the positioning device list 516 is not empty but the closest POD in the list is BUSY, the transmission power adjusting means 515 will set a smaller power to broadcast CRP for possible new POD discovering. Here, as an example, the tag device can select transmission time of the CRP message. If the tag device cannot find a nearer positioning device even if after it has reduced the transmission power, the tag device will not reduce the transmitting power any more, but waiting for the nearest positioning device $R_{nearest}$ in the list converting from BUSY to IDLE. Then, the transmission power adjusting means 515 adjusts the transmission power to make the channel request means 511 broadcast CRP message to the nearest POD.

Next, in the step 701b, POD 520 receives the CRP message. Upon receipt of the CRP message, POD 520 determines whether its own status is IDLE (step 702b). If not, POD 520 discards the message in the step 704b. If the POD 520 is in IDLE, the status response means 521 broadcasts, after a random delay, a Channel Allocation Packet (CAP) as response. Data structure of the CAP message is shown in FIG. 6. CAP message contains CAP_TYPE 603, PODID 604, TagID 605 and Status 606. CAP_TYPE 603 is used for identifying message type, PODID 604 is an identifier for identifying POD that transmitted the CAP message, TagID 605 is an identifier for identifying the tag device to which a channel will be allocated, namely, an identifier of the tag device as sender of the CRP message to which the CAP message is responding, and Status 606 indicates the status of the POD is BUSY or IDLE. When the CAP response is received by the tag device, distance between the POD and the tag device and the status of the POD can be known by the tag device.

In the step 702a, CAP response is received by all tag devices within the coverage of the POD. Tag device that receives the CAP message then uses its transmission decision means 512 to determine whether POD has allocated a channel to it and whether is able to transmit positioning signal, i.e. RF+US data (step 703a). As an example, in the step 703a, the transmission decision means 512 determines whether TagID contained in the CAP message matches its own identifier (e.g. local address). If matched, it means this CAP message is made in response to the CRP message that this tag device ever transmitted and POD has allocated a channel to this tag device. In this case, the tag device can use its positioning signal transmission means 513 to transmit RF+US signal to the corresponding POD (step 704a). The RF+US data is then received by the POD in the step 705b for calculating the position of the object. After the tag device transmits RF+US data to the POD, in the step 705a, the tag device uses its positioning device list updating means 514 to update its positioning device list 516. Similarly, in the step 703a, if the tag device determines that the CAP message is not for its channel allocation, it does not transmit RF+US data. However, in this case ("NO" in the step 703a), the tag device still needs to update its stored positioning device list 516.

The positioning device list 516 is a dynamic list maintained by tag device for monitoring real-time information of neighboring PODs. The positioning device list 516 can be updated according to contents of CAP message. The data structure of the positioning device list 516 is for example as follow:

TABLE 1

| PODID (int) | Distance (m) | Status | NAV (ms) |
|---|---|---|---|
| 1 | 3.3 | BUSY | 50 |
| 2 | 6.5 | IDLE | 0 | wherein NAV denotes busy time interval of corresponding POD.

With information contained in the positioning device list 516, tag device can smartly select transmission target and adaptively adjust transmission power.

Distance between tag device and POD is measured based on received signal strength (RSS) and the free-space propagation model of RF signal. That is, Distance=$D_{RSS}$ can be calculated by the formula:

$$D_{RSS} = d_0 \cdot 10^{\frac{P(d_0) - P_{RSS}}{10m}}$$

wherein m indicates the path loss rate, $P(d_0)$ is the signal power at some reference distance $d_0$, and $P_{RSS}$ is the received signal power at receiver.

The positioning device list 516 is updated when the tag device receives the CAP message. If the POD that transmitted the CAP message has not been included in the positioning device list 516, the tag device adds a new POD entry in the positioning device list 516. Otherwise, the tag device updates the corresponding entry in the positioning device list 516 according to the contents of the CAP message. When the CAP message is received, the last attribute NAV of the corresponding POD entry in the positioning device list 516 can be set as 50 ms. It means during the next 50 ms the POD will be busy.

Return back to FIG. 7, the positioning device list 516 is updated each time when receipt of the CAP message from the POD, no matter whether the CAP message is made with respect to this tag device for allocation of a channel or not. In the step 706a, the transmission power adjusting means 515 of the tag device adjust the transmission power of the CRP message periodically with reference to the positioning device list 516.

As an example, in the present invention, RF+US signal is used as positioning signal, in which the RF signal is used for time synchronization and the US signal is used for distance measurements. Since the RF+US data based positioning method is well-known technology commonly used in the art, its detailed description will be omitted here. In the step 706b, POD determines whether the PODID contained in the positioning signal matches its own ID. If not matched, POD discards the RF+US data (step 708b). If matched, in the step 707b, POD uses the position calculation means 523 to calculate the position of the object according to the RF+US data. As an example, the position calculation means 523 can calculate the position of the object by using Time of Arrival (TOA) result, Time Difference of Arrival (TDOA) result or Angle of Arrival (AOA) result of the US signal. Since these object positioning method are well-known in the art, detailed description thereof will be omitted here.

Figure 8:
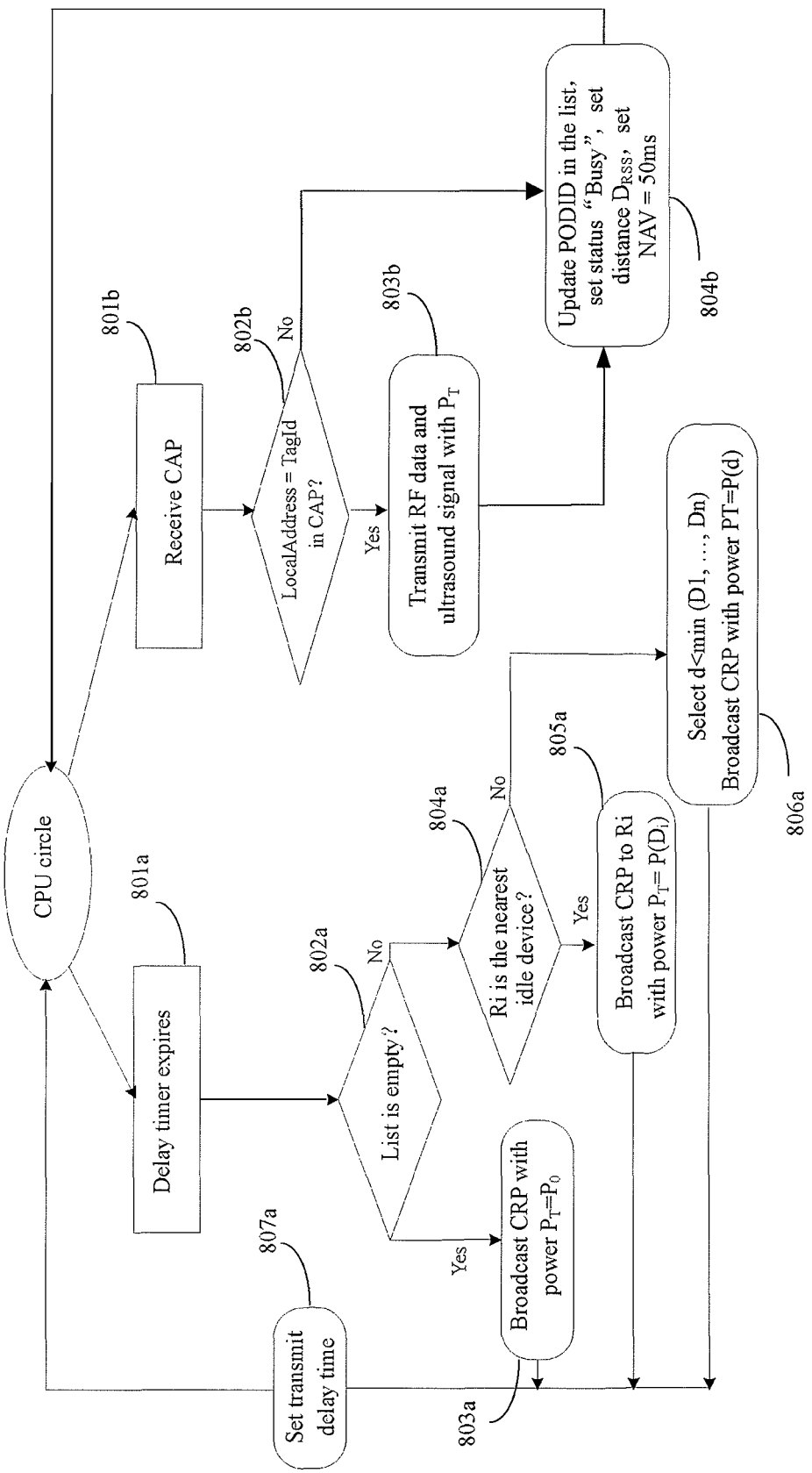
FIG. 8 is a flow chart for showing the operation process on the tag device side.
Figure 9:
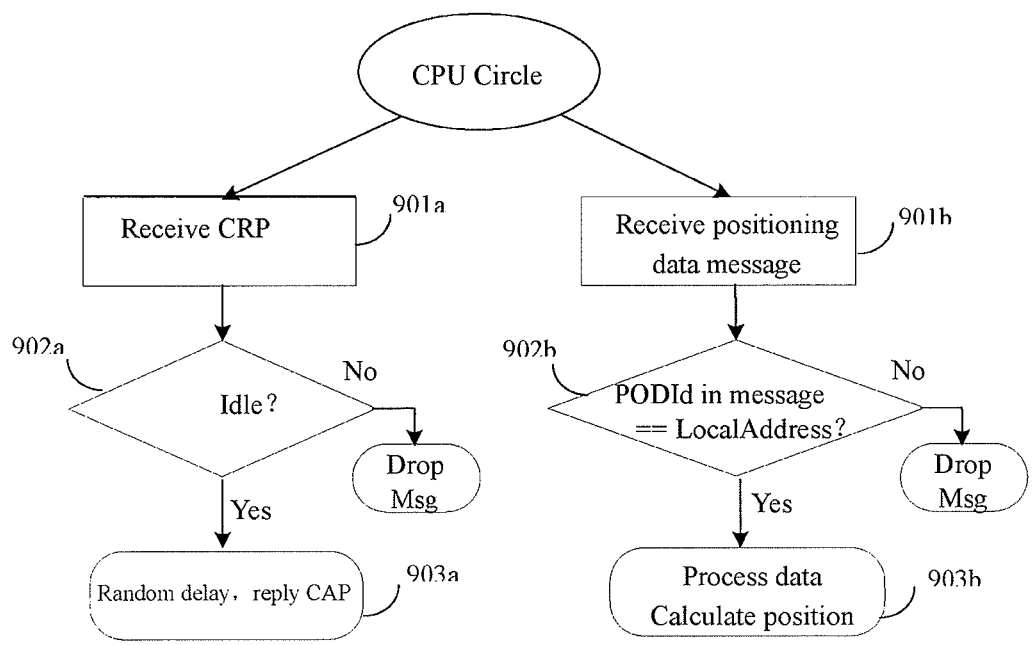
FIG. 9 is a flow chart for showing the operation process on the positioning device (POD) side.

FIG. 8 and FIG. 9 show respectively operation processes on the tag device side and on the positioning device POD side.

As shown in FIG. 8, the operation process of the tag device relate to mainly two missions, i.e. CRP transmitting and CAP processing. In the flow chart of FIG. 8, steps 801a-806a correspond to the CRP transmitting process, and steps 801b-804b correspond to the CAP processing. CRP transmitting realizes the functions of channel request and adaptive power control. CAP processing realizes the functions of transmission decision and online updating of the positioning device list.

1. CRP Transmitting

CRP message is repeatedly broadcasted by tag device. The tag device delays a random time before broadcasting each CRP message. At the time when the delay timer expires (step 801a), CPU of the tag device is interrupted to handle this timer expiring event. At this moment, CRP message will be sent for channel request. As described above, the transmission power of CRP is adaptively selected according to the current status of the positioning device list 516. The process of adjusting the transmission power is as follow:

(1) If the positioning device list of the tag device is empty ("Yes" in the step 802a), default initial transmission power $P_0$ will be selected for CRP transmission (step 803a). That is to select $P_T = P_0$ and broadcast CRP, where $P_0$ is a default transmission power;

(2) If the positioning device list is not empty ("No" in the step 802a), it is determined in the step 804a whether the nearest positioning device POD Ri in the list is IDLE. If the nearest POD Ri is IDLE, the tag device adjusts its power in the step 805a to broadcast CRP to the nearest and IDLE POD Ri. The transmission power of CRP can be determined based on the distance from the tag device to the nearest POD, which is derived from the propagation function of RF signal; and (3) If the positioning device list is not empty ("No" in the step 802a) and the nearest POD in the positioning device list is BUSY ("No" in the step 804a), the tag device will set a smaller power to broadcast CRP for possible nearer POD discovering (step 806a). For example, according to distances D1, D2 . . . , Dn of respective PODs in the list, the tag device determines a smaller communication distance d<min (D1, . . . , Dn), and broadcasts CRP with $P_T = P(d)$, where P(d) is the least power to cover distance d. In this way, the tag device can find possible unknown and closer POD.

After once CRP transmitting attempt, the tag device will pose another random delay before the next CRP transmission (step 807a).

2. CAP Processing

As shown in FIG. 8, CAP is processed as the tag device as interrupt events. CAP is a message sent from some POD to response the channel request of some tag device. As shown in FIG. 6, CAP message contains four variables in its payload: CAP_TYPE, PODID, TagID and Status. PODID indicates the sender of this CAP; TagID indicates which Tag the CAP wants to answer; and Status indicates the status of the sender POD. CAP is used for channel assignment and updating of positioning device list. When a CAP message is heard by the tag device (step 801b), different processing procedures will be performed according to the content of the CAP message.

(1) If TagID in CAP message is the same as the Local_Address of the tag device ("Yes" in the step 802b), it means the CAP is just answering this tag device's channel request. In this case, the tag device will determine to transmit RF+US data (step 803b). Next, in the step 804b, the positioning device list is updated according to the content of the CAP message. Because of the intended RF+US transmission between the tag device and the POD, the tag device knows that the POD will be BUSY in the following 50 ms. Thus, information of the POD is updated accordingly in the positioning device list. The process of updating the list is for example as follow:

a) If the POD is new to the positioning device list, a new entry is added into the list with the key=PODID. Distance from the tag device to the POD is measured by RSSI. Status of the POD is set to BUSY and NAV of the POD is set to 50 ms;

b) If the POD is already in the positioning device list, its information is updated. Distance is reset to the new measurement; Status is set to BUSY and NAV is set to 50 ms.

(2) Otherwise, if TagID in CAP message is not the same as the Local_Address of the tag device ("No" in the step 802b), it means the CAP is answering other tag device's channel request. In this case, the tag device will not transmit RF+US data, but directly updates the positioning device list (step 804b). From the CAP message, the tag device knows other tag device will communicate with the POD in next 50 ms and distance can be measured by RSSI, so the list can be updated accordingly. The process of updating the list is for example as follow:

a) If the POD is new to the positioning device list, a new entry is added into the list with the key=PODID. Distance from the tag device to the POD is measured by RSSI. Status of the POD is set to BUSY and NAV of the POD is set to 50 ms;

b) If the POD is already in the positioning device list, its information is only updated. Distance is reset to the new measurement; Status is set to BUSY and NAV is set to 50 ms.

As described above, no matter whether to send RF+US data or not, the positioning device list in the tag device needs to be updated. This helps the tag device to continuously update information of neighborhood PODs. If the tag device determines to transmit RF+US, it broadcasts RF+US messages to communicate with the POD. The transmission power of RF is the same as the power of CRP, which is determined adaptively during the CRP transmission process.

FIG. 9 shows an operation process on the POD device side. According to the types of messages received by POD, the working diagram can be divided into two branches: CRP message processing and RF+US data processing. Both CRP message and RF+US data are handled as interrupt events.

1. CRP Message Processing

In the step 901a, when a CRP message detection event is triggered, CRP message is processed according to the Status of POD.

1) If current status of POD is IDLE ("Yes" in the step 902a), a CAP message is sent out after a little random delay (step 903a). In the CAP message, TagID is set to the TagID of CRP and Status is Set to IDLE. The CAP is used to tell the status of POD and assign channel for tag devices. It means the channel request successes and the tag device can send RF+US data. The little random delay is used to avoid simultaneous CAP response to avoid collision; and 2) If the status of POD is BUSY ("No" in the step 902a), the CRP message is dropped. In this case, no CAP will be answered to CRP when POD is BUSY. This is to insure that if the POD sends a CAP, it successfully assigns RF+US channel to a tag device.

We can see, when CRP message is received, CAP message is replied accordingly to the Status of POD.

2. RF+US Data Processing

On receiving RF+US data (step 901b), the POD checks whether the PODID in the RF message is the same to the Local_Address (step 902b). If the result is TRUE, POD calculates the position of the object according to the RF+US data. For example, the POD can measure TOAs based on RF+US and calculated the tag device's position. If in the case, the PODID in RF message is different with Local_Address, the RF+US message is simply dropped. Using these procedures, the positions of multiple tag devices can be localized by PODs.

Figure 10A:
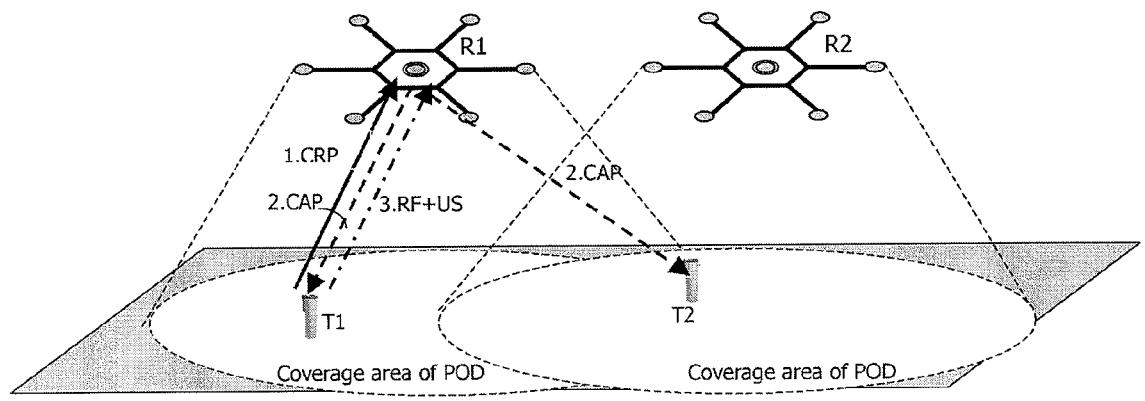
FIGS. 10A and 10B show an example of the operation process of the multi-objects positioning system according to the present invention, which contains two tag devices T1 and T2 and two positioning devices POD R1 and R2.
Figure 10B:
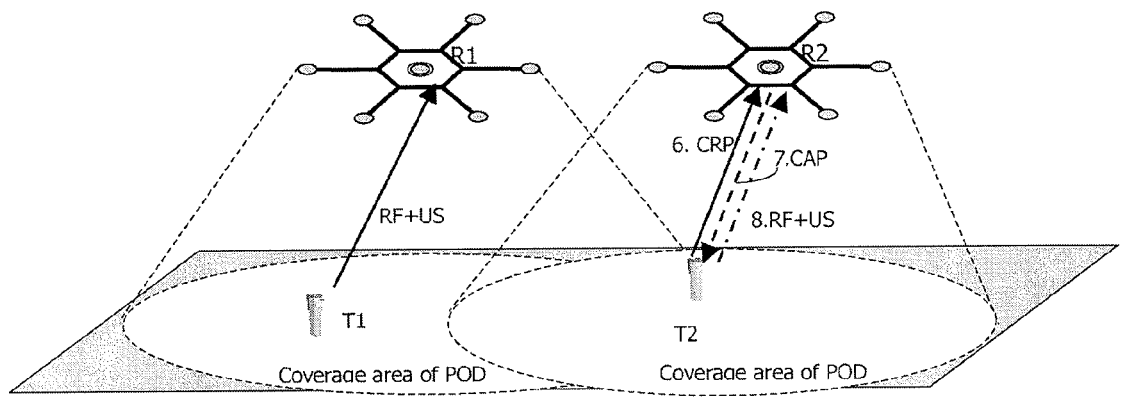

FIGS. 10A and 10B show an example to explain how the power-control based MAC according to the present invention works. In the example, a scenario of two tag devices T1 and T2 and two POD R1 and R2 is shown.

First, with reference to FIG. 10A, initially, positioning device lists of both T1, T2 are empty. In the FIG. 10A, the tag device T1 will first broadcast CRP message with default power level $P_T=P_0$, as indicated by the bold line step 1 in FIG. 10A. Then, POD $R_1$ receives CRP and checks its own status. Since it is IDLE, it broadcasts CAP to all the tag devices (i.e. T1 and T2) within its coverage range to tell its own status and to assign channel to T1, as indicated by the broken line step 2 in FIG. 10A. CAP message is then received by T1 and T2. Because in CAP the TagID=T1, T1 is assigned the channel. Afterwards, T1 transmits data message (RF+US) with power $P_T$, as shown by the dashdotted line step 3 in FIG. 10A. Since both of T1 and T2 receive CAP message from POD R1, no matter whether it determines to transmit the positioning signal, they both update the stored positioning device lists. Tag devices T1 and T2 insert a new entry R1 into their lists with Status=Busy, NAV=50 ms, Distance=$D_{RSSI}$. The positioning device R1 will receive the RF+US message from T1, detect TOA and measure distance from T1 to R1.

In the statue shown in FIG. 10B, the positioning device R1 is BUSY, and R1 has already been included in the positioning device lists of T1 and T2. Since in the CAP message from R1, TagID≠T2, the tag device T2 will not send data to R1. The tag device T2 reduces transmission power $P_T$, enabling $P_T<P_{R1}$, where $P_{R1}$ is the power level to reach $R_1$. Then, the tag device $T_2$ broadcasts CRP with the reduced power $P_T$, as indicated by the bold line step 6 in FIG. 10B. This time $R_2$ will receive CRP from $T_2$. Since $R_2$ is IDLE, it broadcasts CAP to tell its own status and to assign channel to $T_2$, as shown by the broken line step 7 in FIG. 10B. The CAP message is received by $T_2$. Because in CAP the TagID=$T_2$, $T_2$ is assigned the wireless channel. So that it transmits data message (RF+US) with power $P_T$, as shown by the dashdotted line step 8 in FIG. 10B. Then, $T_2$ updates its list to insert a new entry $R_2$ into its list with Status=Busy, NAV=50 ms, Distance=$D_{RSSI}$. The positioning device $R_2$ will receive the RS+US message from $T_2$, detect TOA and measure distance from $T_2$ to $R_2$.

The foregoing description is an example of the power-control based MAC method according to the present invention. However, the application of the present invention is not limited to this example. For example, the present invention can also be applied to multiple access case that includes multiple tag devices and multiple positioning devices.

The power-control based MAC method according to the present invention can solve the above-mentioned EN and HN problems effectively.

1. Exposed Node (EN) Free

Figure 1:
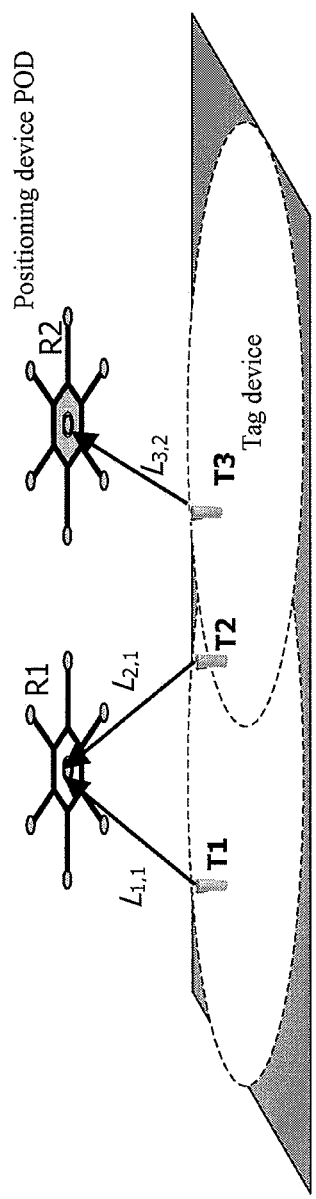
FIG. 1 is a schematic diagram for showing a multi-objects positioning system.
Figure 2A:
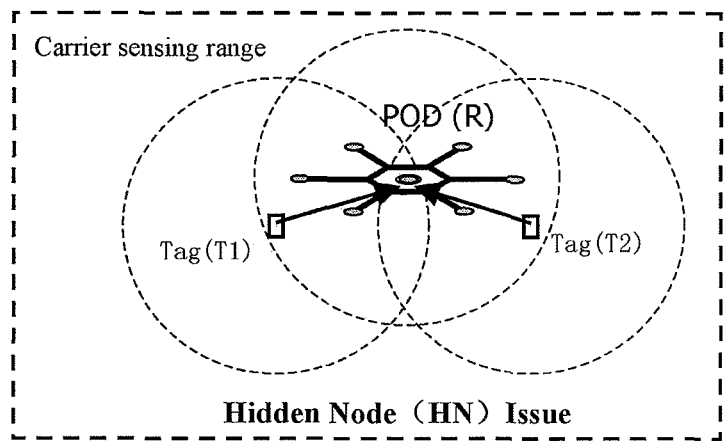
FIG. 2A is a schematic diagram for explaining Hidden Node (HN) problem.
Figure 2B:
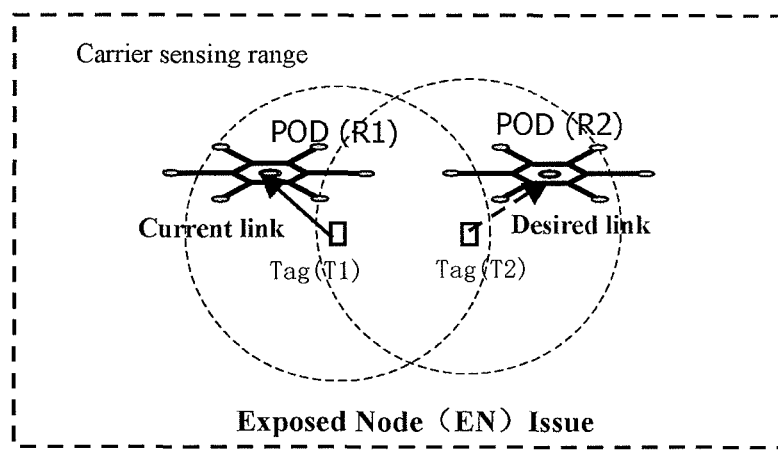
FIG. 2B is a schematic diagram for explaining Exposed Node (EN) problem.
Figure 3:
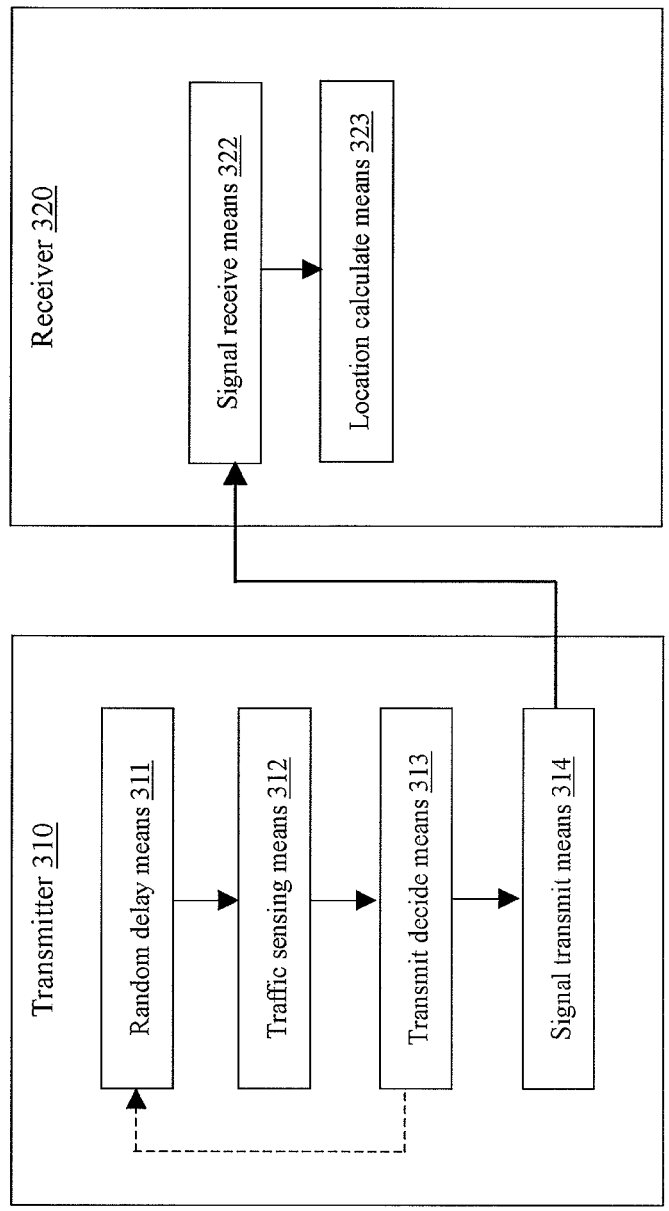
FIG. 3 is a structural block diagram for showing a multi-objects positioning system according to the prior art.
Figure 4A:
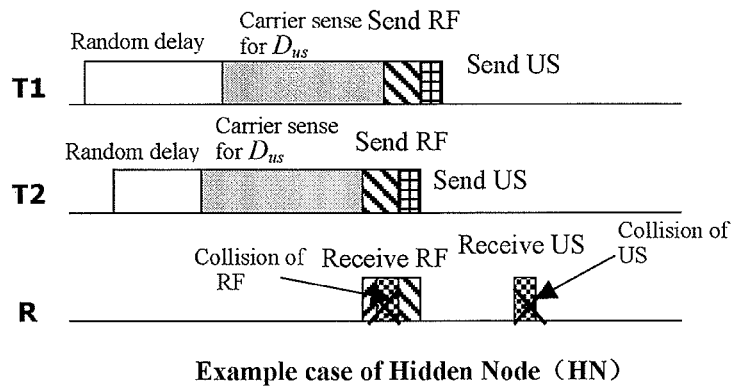
FIG. 4A is a timing chart for showing the case that the system shown in FIG. 3 encounters a HN problem.
Figure 4B:
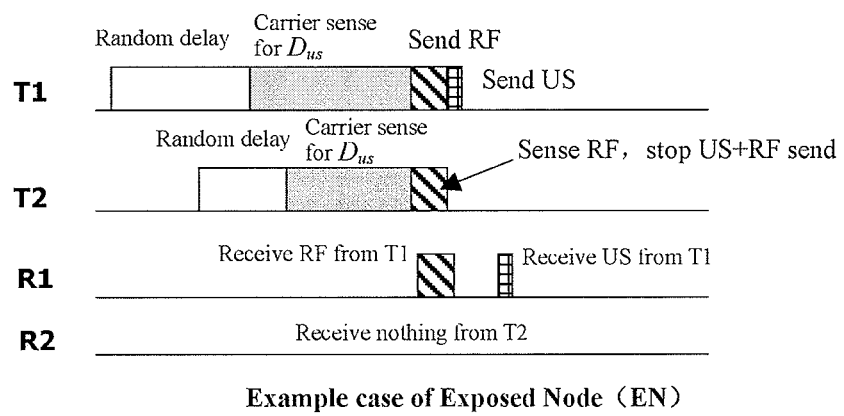
FIG. 4B is a timing chart for showing the case that the system shown in FIG. 3 encounters a EN problem.

First, recall the condition of EN problem as described in Equation (2) and shown in FIG. 2B. Suppose T1, T2, R1, R2 satisfy the EN node condition and T1 is transmitting to R1, as shown in FIG. 2B. In prior arts such as CSMA, T2 cannot communicate directly with R2 because T2 can sense the active traffic of T1. However, indeed, the two transmission links: T1 to R1 and T2 to R2 can simultaneously happen without collision. Thus, EN problem causes waste of wireless channel.

In the power-control based MAC method according to the present invention, because carrier sensing is no longer the evidence of transmission decision, even though T2 can sense the active traffic of T1, T2 still transmits RF+US data to its intended POD T2. That is to say, although T2 can sense the active traffic of T1, the communication link from T2 to R2 can still be successfully established according to CRP-CAP exchanging and the content of the positioning device list, no matter whether tag devices can sense between each other. More exactly, for this example of FIG. 2B, there are two cases for transmission decision in T2:

1) If R1's CAP is not received by T2, T2 selects transmission power of CRP according to positioning device list and broadcasts CRP to request channel. When the CRP is received by R2, R2 will reply CAP to assign channel to T2. Thus, links T1→R1 and T2→R1 can be established simultaneously;

2) If R1's CAP is received by T2, T2 is aware of R1's busy status. According to EN condition, there must be: |T2−R2|<|T2−R1|. According to power adaptation of the MAC method of the present invention, T2 will reduce transmission power to broadcast CRP to request channel. When the CRP is received by R2, R2 will reply CAP to assign channel to T2. Thus links T1→R1 and T2→R1 are established simultaneously.

It can be seen that for both cases, under the EN condition, simultaneous links can be successfully established. Thus, the power-control based MAC method according to the present invention can solve the EN problem effectively.

2. Conditional Hidden Node (HN) Free

Recall the condition of Hidden Node (HN) as shown in Equation (1) and the scenario as shown in FIG. 2A. As shown in FIG. 2A, in prior art such as CSMA, because T1 and T2 cannot sense each other's traffic, they will transmit simultaneously to POD R and result in signal collision at R.

However, In the MAC method of the present invention, if T1 transmits CRP to R, R will reply CAP. We only need to set the radius of CAP to be larger than the transmission radius of both T1 and T2. Then both T1 and T2 will receive the CAP from R. Thus, when T1 is transmitting to R, T2 will be notified that R is BUSY by CAP. Thus T2 will not send message to R to avoid signal collision to the link of T1→R. Therefore, with the MAC method of the present invention, the condition for HN free is that:

$$\begin{cases} D_{CAP} > |T_1 - R| \\ D_{CAP} > |T_2 - R| \end{cases} \quad (3)$$

where $D_{CAP}$ is the communication radius of CAP packet. In applications, we can choose $D_{CAP}$ to be larger than the maximum transmission distance of the tag device so that the MAC of the present invention can be conditional HN-free and the condition is easily satisfied.

Therefore, in the present invention, it can guarantee at any time every receiver is communicated with only one transmitter. Thus, RF and US collision will not happen. In addition, since tag devices s can smartly select the nearest and IDLE POD and appropriately adjust transmission power to avoid interference with other tag devices, simultaneous connections between different tag devices and PODs are possible. Therefore, the spatio-temporal reuse can be highly improved compared with prior arts.

In the above embodiments, several specific steps are shown and described as examples. However, the method process of the present invention is not limited to these specific steps. Those skilled in the art will appreciate that these steps can be changed, modified and complemented or the order of some steps can be changed without departing from the spirit and substantive features of the invention.

Although the invention has been described above with reference to particular embodiments, the invention is not limited to the above particular embodiments and the specific configurations shown in the drawings. For example, some components shown may be combined with each other as one component, or one component may be divided into several subcomponents, or any other known component may be added. The operation processes are also not limited to those shown in the examples. Those skilled in the art will appreciate that the invention may be implemented in other particular forms without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A power-control based multiple access control method for a multi-objects positioning system, which comprises a plurality of tag devices carried by the objects and one or more positioning devices for determining the positions of the objects, wherein each of the tag devices includes a storage unit for storing a positioning device list, which is used for recording status information of the positioning devices, the method comprising:
   tag device broadcasting Channel Request Packet (CRP) intermittently;
   positioning device, which is idle and receives the CRP, broadcasting Channel Allocation Packet (CAP) in the range of coverage, wherein the CAP is used for allocating a channel to the tag device that is the sender of the CRP received by the positioning device and informing information of the positioning device to other tag devices;
   tag device, which receives the CAP, updating the positioning device list stored therein according to the contents of the CAP; and
   tag device adjusting transmission power of the CRP by referring to the positioning device list.

2. The method according to claim 1, wherein the CRP includes a TagID for identifying the tag device.

3. The method according to claim 1, wherein the CAP includes a TagID for identifying the tag device, a PODID for identifying the positioning device and status information of the positioning device.

4. The method according to claim 3, wherein the step of updating the positioning device list comprises:
   searching, in the positioning device list, the PODID contained in the CAP;
   if there is no an entry corresponding to the PODID found in the positioning device list, adding an entry related to the positioning device in the positioning device list; and
   if there is an entry corresponding to the PODID found in the positioning device list, updating the items in the corresponding entry.

5. The method according to claim 3, further comprising:
   after receipt of the CAP, the tag device comparing the TagID included in the CAP with its own ID, and if matched, sending positioning signal to the positioning device that broadcasts the CAP; and
   the positioning device determining the position of the object that carries the tag device by using the positioning signal.

6. The method according to claim 5, wherein the positioning signal is US+RF signal.

7. The method according to claim 6, wherein the positioning device calculates the position of the object according to the Time-of-Arrival (TOA) results of the positioning signal.

8. The method according to claim 1, wherein the positioning device list includes a plurality of entries, each entry corresponding to a positioning device and composed of the following items:
   a PODID for the positioning device;
   distance between the positioning device and the tag device;
   status of the positioning device; and
   non-available interval of the positioning device.

9. The method according to claim 8, wherein the step of adjusting the transmission power of the CRP comprises:
   when the positioning device list is empty, broadcasting the CRP with an original transmission power;
   when the positioning device list is not empty and the nearest positioning device listed therein is Idle, adjusting the transmission power to broadcast the CRP to the nearest positioning device; and
   when the positioning device list is not empty but the nearest positioning device listed therein is Busy, reducing the transmission power to broadcast the CRP with a lower transmission power.

10. The method according to claim 9, wherein if the tag device does not find a nearer positioning device after broadcasting the CRP with the lower transmission power, the tag device does not reduce the transmission power any more, but waiting for the nearest positioning device listed in the positioning device list to change its status from Busy to Idle, and then adjusts the transmission power to broadcast the CRP to the nearest positioning device.

11. A multi-objects positioning system capable of implementing power-control based multiple access control, which comprises a plurality of tag devices carried by the objects and a plurality of positioning devices for determining the positions of the objects, and wherein
   the tag device comprises:
   a storage means for storing a positioning device list, which is used for recording status information of the positioning devices;
   a channel request means for broadcasting Channel Request Packet (CRP) intermittently;
   a positioning device list updating means for updating the positioning device list according to contents of Channel Allocation Packet (CAP) received from the positioning device; and
   a transmission power adjusting means for adjusting transmission power of the CRP by referring to the positioning device list, and
   the positioning device comprises:
   a status response means for receiving the CRP from the tag device, and when the positioning device is Idle, broadcasting the CAP in the range of coverage, wherein the CAP is used for allocating a channel to the tag device that is the sender of the CRP received by the positioning device and informing information of the positioning device to other tag devices.

12. The system according to claim 11, wherein the CRP includes a TagID for identifying the tag device.

13. The system according to claim 11, wherein the CAP includes a TagID for identifying the tag device, a PODID for identifying the positioning device and status information of the positioning device.

14. The system according to claim 13, wherein positioning device list updating means comprises:
   a search unit for searching, in the positioning device list, the PODID contained in the CAP;

an addition unit for adding an entry related to the positioning device in the positioning device list, if there is no an entry corresponding to the PODID found in the positioning device list; and a update unit for updating the items in an entry corresponding to the PODID, if the entry has already existed in the positioning device list.

15. The system according to claim 13, wherein
the tag device further comprises:
a transmission decision means for after receipt of the CAP from a positioning device, comparing the TagID included in the CAP with its own ID to decide whether or not to transmit positioning signal; and
a positioning signal transmission means for transmitting the positioning signal to the positioning device if the transmission decision means determine that the TagID contained in the CAP is matched to its own ID, and
the positioning device further comprises:
a positioning signal receiving means for receiving the positioning signal from the tag device; and
a position calculation means for calculating the position of the object that carries the tag device by using the positioning signal.

16. The system according to claim 15, wherein the positioning signal is US+RF signal.

17. The system according to claim 16, wherein the positioning device calculates the position of the object according to Time-of-Arrival (TOA) results, Time-Difference-of-Arrival (TDOA) results or Angle-of-Arrival (AOA) results of the positioning signal.

18. The system according to claim 11, wherein the positioning device list includes a plurality of entries, each entry corresponding to a positioning device and composed of the following items:
a PODID for the positioning device;
distance between the positioning device and the tag device;
status of the positioning device; and
non-available interval of the positioning device.

* * * * *

UNITED STATES PATENT AND TRADEMARK OFFICE
CERTIFICATE OF CORRECTION

PATENT NO. : 8,548,490 B2  
APPLICATION NO. : 12/607364  
DATED : October 1, 2013  
INVENTOR(S) : Yongcai Wang and Junhui Zhao Page 1 of 1

It is certified that error appears in the above-identified patent and that said Letters Patent is hereby corrected as shown below:

In the Specification

Column 3, Line 4: Delete "elaborately" and insert -- elaboratively --

Column 4, Line 62: Delete "FIN" and insert -- HN --

In the Claims

Column 16, Line 33: In Claim 11, delete "a plurality of" and insert -- one or more --

Signed and Sealed this
Fourth Day of November, 2014

Michelle K. Lee
*Deputy Director of the United States Patent and Trademark Office*